Figure 1:
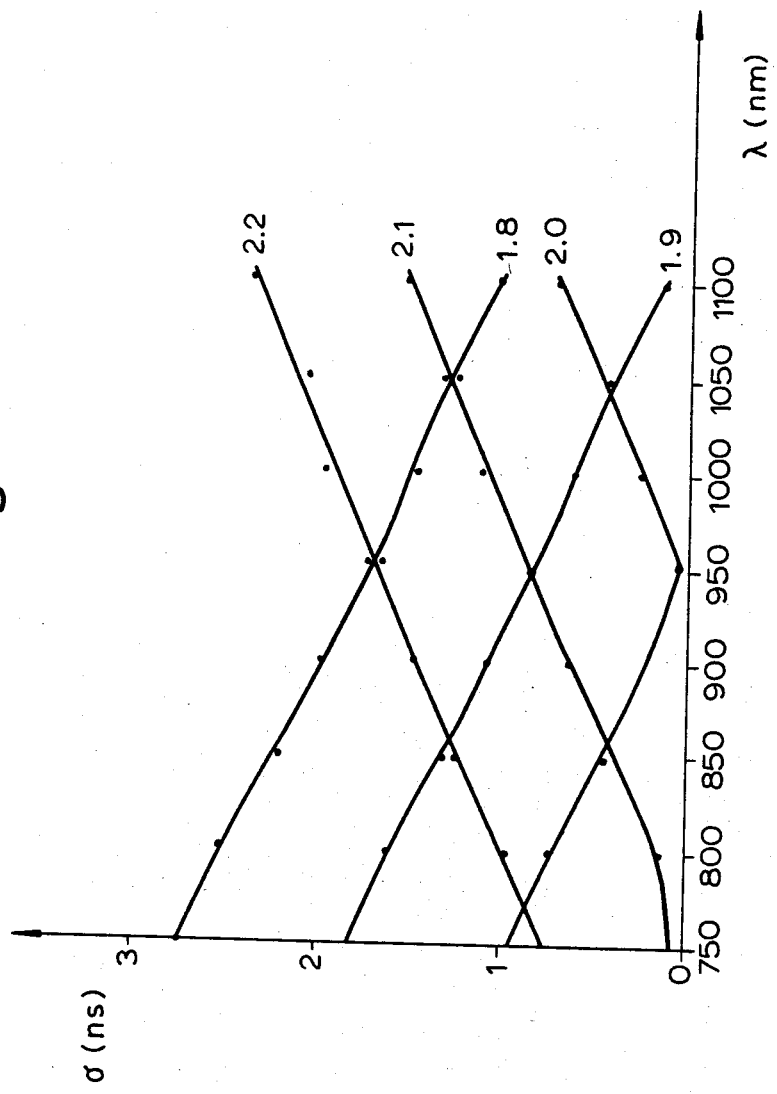

United States Patent [19]

Eve

[11] 4,205,900
[45] Jun. 3, 1980

[54] OPTICAL CABLES
[75] Inventor: Michael Eve, Felixstowe, England
[73] Assignee: The Post Office, London, England
[21] Appl. No.: 894,102
[22] Filed: Apr. 6, 1978
[30] Foreign Application Priority Data
Apr. 7, 1977 [GB] United Kingdom ............... 14757/77
[51] Int. Cl.² .............................................. G02B 5/14
[52] U.S. Cl. .................................. 350/96.31; 350/96.30
[58] Field of Search ............................ 350/96.30, 96.31
[56] References Cited
U.S. PATENT DOCUMENTS
3,571,737  3/1971  Miller .................................. 350/96.30
3,980,391  9/1976  Stewart .............................. 350/96.31

Primary Examiner—Rolf G. Hille
Attorney, Agent, or Firm—Kemon & Estabrook

[57] ABSTRACT

Optical fibres and optical cables of improved bandwidth, especially intended for use in a communications system. Over-compensated and under-compensated fibres or cable sections are connected alternately so that each fibre or cable section tends to correct the modal dispersion originating in the previous fibre or cable section, giving a narrower overall impulse response and hence a better bandwidth. This arrangement also substantially reduces the variation of bandwidth with source wavelength.

4 Claims, 2 Drawing Figures

OPTICAL CABLES

The present invention relates to optical fibres and optical cables for use as dielectric optical waveguides. The invention is especially concerned with obtaining dielectric optical waveguides having a large bandwidth for use in a communications system.

In the present Specification the term "optical waveguide" is to be understood as including dielectric waveguides propagating electromagnetic energy in the ultraviolet, visible and infrared regions of the spectrum.

In general the use of multimode guides for communications systems suffers from one obvious limitation, namely that imposed by the differential delay dispersion between modes. The different speeds of propagation of the different modes through the fibre cause broadening of the impulse response and a corresponding reduction in bandwidth.

Two different approaches have been tried in order to alleviate this problem. In stepped index fibre, it is possible to select the material and dimensions of the core to provide an inherent mode filter. The smaller the core diameter, the smaller the number of modes that can be propagated along the fibre; at a core diameter of the order of $2.5\mu$, only one mode will propagate. The difficulties encountered in jointing together fibres of such small core diameter are, however, substantial.

The alternative approach to modal dispersion consists in the use of graded index fibre, in which the refractive index has a virtually continuous radial variation from the axis to the periphery. In theory, the radial variation of refractive index should be such that the propagation periods of all modes through the fibre are substantially equalised. In practice, however, it is not possible to control the index variation sufficiently accurately to produce fibre behaving in this ideal fashion, and real fibre is almost invariably either over-compensated or under-compensated, ie, high-order modes propagate faster or slower respectively than do other modes. It has now been found that the bandwidth of an optical route consisting of graded index fibre can be considerably improved by connecting lengths of over-compensated and under-compensated fibre alternately so that each section tends to correct the differential delay dispersion originating in the previous section.

The present invention accordingly provides an optical fibre comprising a plurality of sections of graded index optical fibre joined end-to-end, the sections being so arranged that sections through which a first group of light modes has a higher propagation rate than has a second group of light modes alternate with sections through which the said second group of light modes has a higher propagation rate than has the said first group.

The lengths of two adjacent sections are advantageously so chosen as substantially to equalise the propagation periods of the said first and second groups of modes through the two sections. The invention accordingly further provides an optical fibre comprising first and second sections of optical fibre joined end-to-end, the propagation rate of a first group of light modes through the first section being higher than that of a second group of light modes and the propagation rate of the said second group of light modes through the second section being higher than that of the said first group of light modes, and the lengths of the first and second sections being so chosen as substantially to equalise the propagation periods of the said first and second groups of light modes through the two sections.

For convenience, the two types of fibre which are alternated according to the invention will be referred to in the present Specification as "over-compensated" and "under-compensated". In over-compensated fibre, as previously mentioned, higher-order modes tend to propagate faster than other modes, and in under-compensated fibre and higher-order modes tend to propagate more slowly than other modes.

The individual fibre sections may be jointed together to give fibres according to the invention by any method suitable for jointing graded index optical fibres. Especially suitable methods are described in British Patent Specifications Nos. 1 430 979, 1 447 317 and 1 448 741, the disclosures of which are incorporated herein by reference.

Fibres according to the invention may be grouped together to form multi-fibre optical cables. A further subject of the present invention is therefore an optical cable comprising a plurality of optical fibres as previously defined; the fibres are suitably arrayed around a strength member.

A further possibility envisaged according to the invention is the grouping of like fibres together to form optical cable sections in which all the fibres are of the same compensation type, ie, all are over-compensated or all are under-compensated. Such pregrouped cable sections can then be jointed together such that over-compensated and under-compensated sections alternate. Again, any convenient jointing method may be used, for example, the methods disclosed in the British Patent Specifications Nos. 1 430 979, 1 447 317 and 1 448 741 mentioned above. In an optical cable produced in this manner, each individual fibre will consist of alternating over-compensated and under-compensated sections.

Accordingly, yet another subject of the invention is an optical fibre cable section comprising a plurality of graded index optical fibres arranged in parallel, the propagation rate of a first group of light modes through every fibre being higher than the propagation rate of a second group of light modes.

Furthermore, the invention also provides an optical cable or cable section comprising a first cable section as defined in the previous paragraph jointed to a second optical fibre cable section comprising a plurality of graded index optical fibres arranged in parallel, the propagation rate of the said second group of light modes through every fibre being higher than the propagation rate of the said first group of light modes.

Advantageously, the lengths of the said first and second cable sections are so chosen that the propagation periods of the first and second groups of light modes through the two sections of cable are substantially equalised. This is not, however, essential; even without such length matching, the improvement over a random arrangement of over-compensated and under-compensated sections has been found to be substantial.

The invention enables the tolerance requirements on graded index fibres to be reduced at an acceptable penalty of slightly more complicated cabling and installation.

In order to produce optical fibres and optical cables according to the invention, it is of course necessary to be able to determine whether a particular fibre is over-compensated or under-compensated, and this may be done in various ways. One possible method is spatial filtering. A light pulse is transmitted down the fibre and the effect on the emerging output beam of removing high-angle rays and thus partially eliminating the higher-order modes is observed.

The nature of the compensation is also determinable theoretically from the measured refractive index profile of the fibre. The profile of a graded index fibre can be represented by the following formula:

$$n = n_0[1 - 2\Delta(r/a)^\alpha]^{\frac{1}{2}} \qquad (I)$$

wherein
$n_0$ is the refractive index at the axis,
n is the refractive index at a distance a from the axis,
r is the radius of the fibre,
$\Delta = n_0^2 - n_c^2/2n_0^2$,
$n_c$ is the refractive index of the cladding, and
$\alpha$ is a constant, approximately equal to 2.

$\alpha$ is the characteristic constant of the fibre and determines the modal dispersion. If $\alpha$ has a certain optimal value, the fibre behaves ideally; if $\alpha$ is above that value the fibre is over-compensated, and if $\alpha$ is below that value the fibre is under-compensated. Provided that the optimal value of $\alpha$ is known, determination of the refractive index profile and hence of the $\alpha$-value gives the nature of the compensation. It should be noted that the optimal value of $\alpha$ depends on the source wavelength; at 850 nm it is believed to be approximately 2.05.

It is possible to demonstrate theoretically that alternate connection of over-compensated and under-compensated fibres, as provided by the invention, leads to a reduction in modal dispersion, by means of a statistical model. Considering any optical fibre as a delay line, then the density of probability of arrival of an injected monochromatic photon at the far end of the fibre can be determined from the fibre impulse response for an impulse injected at the fibre near end. If $\tau$ is the time of travel of the photon, then, statistically, the variance of $\tau$ is the root-mean-square width $\sigma$ of the impulse response. The quantity $\sigma$ is thus a measure of modal dispersion and is desirably as small as possible.

If two fibres 1 and 2 of which the root-mean-square widths of the impulse response are $\sigma_1$ and $\sigma_2$ respectively are jointed together, a known theorem on variance states that $$\sigma^2 = \sigma_1^2 + \sigma_2^2 + 2\sigma_1\sigma_2 r_{12} \qquad (II)$$

wherein
$\sigma$ is the overall root-mean-square width of the impulse response of the jointed pair and
$r_{12}$ is the correlation coefficient between $\tau_1$ and $\tau_2$, the times of travel in the fibres 1 and 2 respectively.

Obviously, the smaller $\sigma_1$ and $\sigma_2$, the smaller will be the overall $\sigma$. It is also clear, however, that a small value of $\sigma$ will result, even if $\sigma_1$ and $\sigma_2$ are not especially small, if $r_{12}$ is large and negative.

It will be recalled that $r_{12}$ is the correlation coefficient between $\tau_1$ and $\tau_2$, ie, the extent to which $\tau_1$ influences $\tau_2$. If there is little exchange of power between modes (mode-mixing) within the fibre or at the joints, $r_{12}$ will be large, being positive if both fibres are of the same compensation type and negative if one is over-compensated and the other under-compensated. If mode-mixing occurs, $r_{12}$ will be small.

When jointing more than two fibres together, ignoring correlations between non-adjacent fibres, the equation becomes $$\sigma^2 = \Sigma\sigma_p^2 + 2\Sigma\sigma_k\sigma_{k+1}r_{k/k+1} \qquad (III)$$

Wherein $\sigma_p$ is the root-mean-square width of the impulse response of each individual fibre and k and (k+1) represent two adjacent fibres. Thus a minimum value of $\sigma^2$ is obtained if $r_{k/k+1}$ is large and negative, ie, if over-compensated and under-compensated fibres alternate. With modern low-loss and mode-mixing-free fibres the amount of mode-mixing is sufficiently low to give a large value of $r_{k/k+1}$.

It has also been found that another, surprising, advantage is gained by connecting alternating lengths of over-compensated and under-compensated fibre: the variation of modal dispersion with source wavelengths over a particular wavelength range can be substantially reduced, as compared with that of a single fibre or a randomly connected link. This is of importance when the capacity of an optical link is to be increased by using two or more sources of different wavelengths; it also lessens the effect on bandwidth of a drift in source wavelength.

As previously mentioned, the $\alpha$-value of a fibre is independent of source wavelength but the optimal value of $\alpha$ is strongly wavelength-dependent, so that any given fibre will exhibit optimal behaviour at one particular wavelength only and at other wavelengths will be either over-compensated or under-compensated. The root-mean-square width of the impulse response, $\sigma$, which serves as a measure of modal dispersion, is thus dependent both on the $\alpha$-value of the fibre and on the source wavelength. The relationship is complex but by an approximation of the results in Olshansky and Keck, Williamsburg 1975 Comm. Tuc5-1 is given, when all modes are equally excited, by the following equation:

$$\sigma(\alpha,\lambda) = \frac{N_0\Delta}{2c} \frac{\alpha}{\alpha+1} \sqrt{\frac{\alpha+2}{3\alpha+2}} \left(\frac{\alpha-2-\epsilon(\lambda)}{\alpha+2}\right) \qquad (IV)$$

where
$\Sigma(\lambda) = -2n_0/N_0\cdot\lambda/\Delta \; d\Delta/d\lambda$,
$\Delta = n_0^2 - n_c^2/2n_0^2$,
c is the velocity of light in vacuo,
$\lambda$ is the source wavelength,
$n_0$ is the axial refractive index,
$N_0$ is the axial group index, and
$n_c$ is the refractive index of the cladding.

Figure 2:
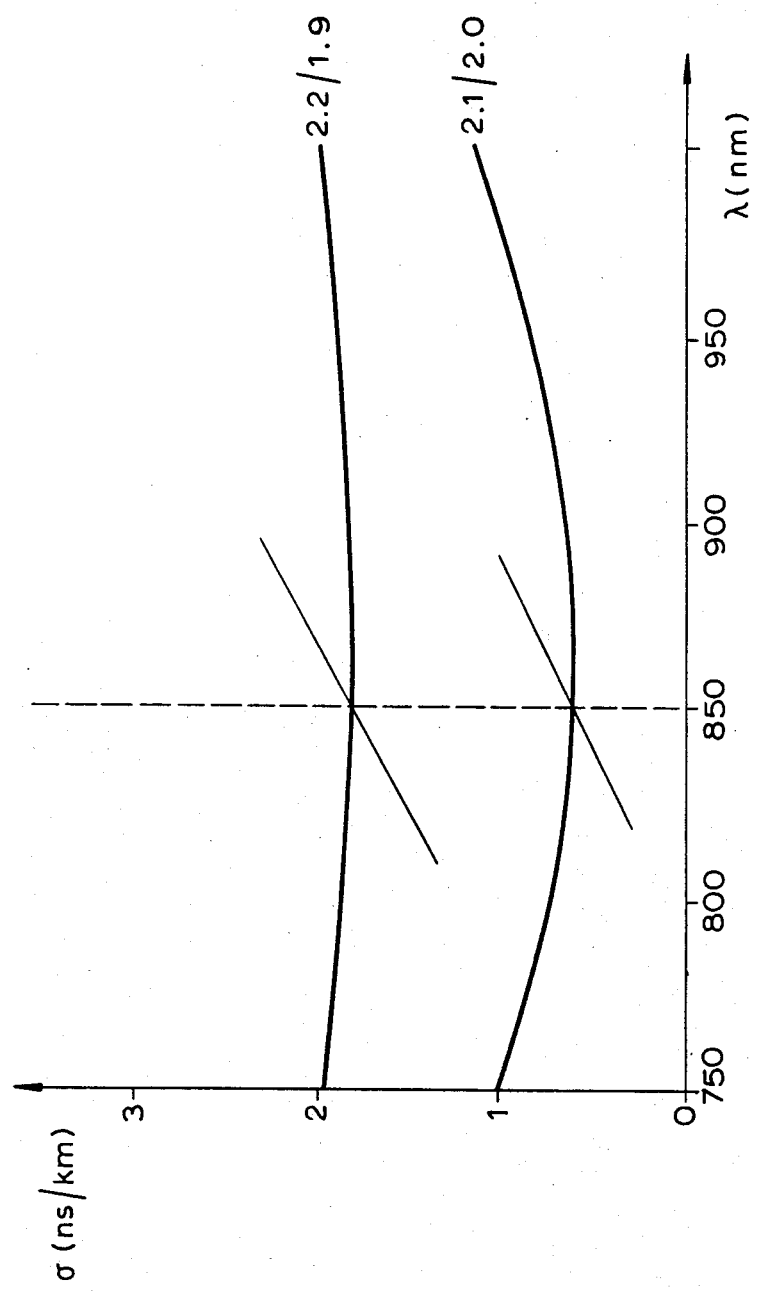

The invention will now be described in further detail, by way of example only, with reference to the accompanying drawings, in which FIG. 1 is a graph showing the dependence of $\sigma$ on the source wavelength $\lambda$ for some single fibres, and FIG. 2 is a graph showing the dependence of the overall $\sigma$ on the source wavelength $\lambda$ for two jointed pairs of fibres.

Referring now to FIG. 1, values of $\sigma$ for five 1 km-long $\alpha$-fibres were computed using the equation given above, the $\Sigma(\lambda)$ values being taken from Presby HM and Kaminow IP, Applied Optics 15, No 12, pages 3029 to 3036. All five fibres were of silicagermania glass and the $\alpha$-values were respectively 1.8, 1.9, 2.0, 2.1 and 2.2. The $\sigma$ values, in ns/km, were plotted against the source wavelength $\lambda$ in nm.

FIG. 2 is the corresponding plot for two 2 km jointed pairs, the first consisting of one 1 km fibre of $\alpha=2.2$ jointed to one 1 km fibre of $\alpha=1.9$, and the second consisting of one 1 km fibre of $\alpha=2.1$ jointed to one 1 km fibre of $\alpha=2.0$. As may be seen, the variation of $\sigma$ with $\lambda$ is very much less than for a single fibre. With this particular choice of fibres, the variation $d\sigma/d\lambda$ is approximately zero at a wavelength of 850 nm, ie, these two systems display optimal behaviour at 850 nm. With appropriate choice of the $\alpha$-values of the fibres, optimal behaviour at a different wavelength could be achieved. It will be seen from FIG. 1 that for over-compensated fibres ($\alpha$ greater than 2), $d\sigma/d\lambda$ is positive, while for under-compensated fibres ($\alpha$ less than 2), $d\sigma/d\lambda$ is negative. This is because the optimum $\alpha$ decreases with wavelength for these particular fibres; this is true for all presently known fibres. It is clear that by choosing a pair of fibres for which the values of $d\sigma/d\lambda$ are equal and opposite at a certain wavelength $\lambda_0$, ie, $d\sigma_1/d\nu=-d\sigma_2/d\lambda$ at $\lambda_0$, it is possible to make the variation of bandwidth with wavelengths very small.

These results can be related to the statistical model discussed earlier. For a jointed pair of fibres 1 and 2, it will be recalled that $$\sigma^2 = \sigma_1^2 + \sigma_2^2 + 2\sigma_1\sigma_2 r_{12} \tag{II}$$

and the result now desired is that $$(d\sigma/d\lambda)_{\lambda_0} = 0 \tag{V}$$

By differentiation of the equation IV:

$$\left(\frac{d\sigma}{d\lambda}\right)_{\lambda_0} = \left(\frac{d\sigma_1}{d\lambda}\right)_{\lambda_0} \frac{\sigma_1 + r_{12}\sigma_2}{\sqrt{\sigma_1^2 + \sigma_2^2 + 2\sigma_1\sigma_2 r_{12}}} + \left(\frac{d\sigma_2}{d\lambda}\right)_{\lambda_0} \frac{\sigma_2 + r_{12}\sigma_1}{\sqrt{\sigma_1^2 + \sigma_2^2 + 2\sigma_1\sigma_2 r_{12}}} = 0$$

If the two fibres are on opposite sides of the optimum, $$\left(\frac{d\sigma}{d\lambda}\right)_{\lambda_0} = \left(\frac{d\sigma_1}{d\lambda}\right)_{\lambda_0} \frac{(1 + r_{12})(\sigma_1 - \sigma_2)}{\sqrt{\sigma_1^2 + \sigma_2^2 + 2\sigma_1\sigma_2 r_{12}}}$$

If the two fibres are of similar bandwidth, ie, their $\sigma$-values are approximately equal, this expression will reduce substantially to zero as desired. Especially favourable results as regards wavelength dependence are therefore obtained, according to the invention, by jointing together fibres of opposite compensation type and substantially equal $\sigma$.

The following Example illustrates the invention.

EXAMPLE

Two 8 megabits/s links each were 5.75 km long and each consisted of six lengths of graded index optical fibre joined at five joints. The first link had three joints in which either an over-compensated fibre length was followed by an over-compensated fibre length or an under-compensated fibre length was followed by an under-compensated fibre length. This link showed a bandwidth of 110 MHz for an average bandwidth of 248 MHz per fibre. The second link had only one joint as described above, the other joints in both cases having an over-compensated fibre length jointed to an under-compensated fibre length. The second link showed a bandwidth of 140 MHz for an average bandwidth of 239 MHz per fibre. This shows clearly that selecting the fibres in a route can improve considerably the bandwidth of the link.

What is claimed is:

1. An optical fibre comprising a plurality of sections of graded index optical fibre jointed end-to-end, the sections being so arranged that sections through which a first group of light modes has a higher propagation rate than has a second group of light modes alternate with sections through which the said second group of light modes has a higher propagation rate than has the said first group whereby each section tends to correct the differential delay dispersion originating in the previous section.

2. An optical fibre comprising first and second sections of graded index optical fibre jointed end-to-end, the propagation rate of a first group of light modes through the first section being higher than that of a second group of light modes, and the propagation rate of the said second group of light modes through the second section being higher than that of the said first group of light modes, and the lengths of the first and second sections being so chosen as substantially to equalise the propagation periods of the said first and second groups of light modes through the two sections.

3. An optical fibre comprising first and second sections of graded index optical fibre jointed end-to-end, the propagation rate of a first group of light modes through the first section being higher than that of a second group of light modes, and the propagation rate of the said second group of light modes through the second section being higher than that of the said first group of light modes, and the lengths of the first and second sections being so chosen as substantially to equalise the root-mean-square widths of the impulse response of the two sections.

4. An optical fibre cable which comprises a first cable section comprising a plurality of graded index optical fibres arranged in parallel, the propagation rate of a first group of light modes through every fibre being higher than the propagation rate of a second group of light modes, jointed to a second optical fibre cable section comprising a plurality of graded index optical fibres arranged in parallel, the propagation rate of said second group of light modes through every fibre being higher than the propagation rate of the said first group of light modes.

* * * * *